US008196865B2

(12) United States Patent
Martin (10) Patent No.: US 8,196,865 B2
(45) Date of Patent: Jun. 12, 2012

(54) FOLDABLE STEP FOR A VEHICLE, AND A VEHICLE PROVIDED WITH SUCH A STEP UNIT (75) Inventor: Eric André Martin, Pourrieres (FR)

(73) Assignee: Eurocopter, Marignane Cedex (FR)

( * ) Notice: Subject to any disclaimer, the term of this patent is extended or adjusted under 35 U.S.C. 154(b) by 642 days.

(21) Appl. No.: 12/236,526

(22) Filed: Sep. 24, 2008

(65) Prior Publication Data

US 2009/0078827 A1     Mar. 26, 2009

(30) Foreign Application Priority Data

Sep. 26, 2007    (FR) ...................................... 07 06754

(51) Int. Cl.
*B64C 1/24* (2006.01)
(52) U.S. Cl. ...................... 244/129.6; 105/444; 105/445; 105/448; 280/163; 280/166
(58) Field of Classification Search ................ 244/129.6; 105/448, 444, 445; 280/163, 166
See application file for complete search history.

(56) References Cited

U.S. PATENT DOCUMENTS

| 2,294,000 | A |   | 8/1942  | Reisner et al. |        |
|-----------|---|---|---------|----------------|--------|
| 3,528,574 | A |   | 9/1970  | Denner et al.  |        |
| 5,584,493 | A | * | 12/1996 | Demski et al.  | 280/166 |
| 5,695,207 | A | * | 12/1997 | Mouterde et al. | 280/163 |
| 6,213,486 | B1 | * | 4/2001  | Kunz et al.    | 280/166 |
| 6,659,224 | B2 | * | 12/2003 | Medsker        | 182/91 |
| 7,677,584 | B2 | * | 3/2010  | Raley et al.   | 280/166 |

FOREIGN PATENT DOCUMENTS

| DE | 1 027 085 A | 3/1958 |
| JP | 54131209 | 9/1979 |
| JP | 55114758 | 9/1980 |
| JP | 61193865 U | 12/1986 |
| JP | 4-339041 A | 11/1992 |
| SU | 403 594 A1 | 10/1973 |

OTHER PUBLICATIONS

Kitamura, "Notice of Reasons for Rejection"; corresponding Japanese patent application 2008-245047; dated Apr. 18, 2011.

* cited by examiner

*Primary Examiner* — J. Woodrow Eldred

(74) *Attorney, Agent, or Firm* — Brooks Kushman P.C.

(57) ABSTRACT

The present invention relates to a foldable step unit (10) for a rotorcraft, the step unit being provided with a bottom step (16) and a stationary support (11) that is secured to the structure of the rotorcraft (2). The step unit (10) comprises a left side beam (14) and a right beam (15) hinged on said stationary support (11), said bottom step (16) being arranged on a left free end (14') and a right free end (15') respectively of the left and right side beams (14, 15) via a pivot pin (16'), drive means (18) for said step unit (10) and connected via at least one control means (21, 22) to at least one side beam (14, 15) enable said step unit (10) to be retracted into and extended from a housing (2) formed in the rotorcraft (1).

20 Claims, 4 Drawing Sheets

FOLDABLE STEP FOR A VEHICLE, AND A VEHICLE PROVIDED WITH SUCH A STEP UNIT

The present invention relates to a foldable step unit enabling a user to embark on or descend from a vehicle such as a rotorcraft, and consequently it also relates to a vehicle provided with a step unit of the invention.

BACKGROUND OF THE INVENTION

Generally, step units are arranged on vehicles so as to make it easy for a user to enter or leave the vehicle. Step units are more particularly useful for vehicles having high ground clearance, e.g. rotorcraft.

Document GB 15077 discloses a first step unit that is partially foldable.

That first step unit comprises a main block provided with a plurality of steps, the main block having first and second bottom steps hinged thereto.

A rod is then secured to the bottom face of the second bottom step. By using a lever, a user then moves the rod so as to fold the first and second bottom steps under the main block.

That first step unit is thus partially foldable, the first and second bottom steps being stored under the main block. However the main block is neither folded nor retracted.

Consequently, it is not possible to enter the step unit into a housing.

However, on rotorcraft, step units are preferably arranged in the bottom space of the fuselage known as the "subfloor structure" to the person skilled in the art. The subfloor structure is then of rounded shape at its ends, which ends are sometimes known as "hull quarters".

In flight, in order to avoid degrading the aerodynamic capacities of the rotorcraft, the step unit is contained completely within a housing situated in the subfloor structure. In general, the housing is arranged mostly within the subfloor structure, but it might possibly project a little therefrom, e.g. because of the presence of cables or pipework.

On the ground, the step unit is deployed and projects from its housing.

Consequently, the first step unit of document GP 15077 is not suitable for rotorcraft insofar as the main block cannot be folded, nor even retracted.

In contrast, document U.S. Pat. No. 5,584,493 discloses a second step unit comprising a single block provided with a plurality of steps.

Since that block is retractable, it can be extended or retracted into a housing with the help of a system that is controlled by pressurized fluid.

Nevertheless, that step unit is relatively bulky insofar as it is merely retractable. The block provided with the step is not itself foldable, so it is not possible to reduce its overall size in order to enter into a housing that is small.

Although effective, the second step unit described in document U.S. Pat. No. 5,584,493 is unsuitable for being arranged on a rotorcraft because of its dimensions, the space available in the "hull quarter" of the subfloor structure of a rotorcraft unfortunately being restricted by its very nature.

Finally, document EP 0 884 218 describes a third step unit.

That third step unit includes a single foldable step, the step passing from an active extended position to an inactive retracted position as a function of moving a door of the vehicle that is fitted with the third step unit.

The third step unit is dedicated specifically to an automobile application.

The third step unit has only one step, which might not be sufficient for a vehicle having relatively high ground clearance.

Furthermore, it can be seen that the step remains outside the vehicle in all of its positions.

Such a configuration would seem to be unsuitable for an aviation application. It can readily be understood that the forces exerted by air on the step would then be sufficient to damage the step unit, e.g. by causing untimely deployment of the step.

OBJECTS AND SUMMARY OF THE INVENTION

An object of the present invention is to provide a step unit that can be contained and held in a housing formed within the fuselage of a rotorcraft.

According to the invention, a foldable step unit for a vehicle, such as a rotorcraft, is provided with a bottom step and with a stationary support that is secured to the structure of the vehicle, the structure of a rotorcraft or for example of a land vehicle notably of the off-road type, an automobile, a bus, or a truck, for example.

The step unit is remarkable in that it comprises a single left side beam and a single right side beam, both hinged to the stationary support, the bottom step being arranged at a left free end and at a right free end respectively of the left and right side beams via a pivot pin, e.g. implemented as a screw. Furthermore, the step unit comprises a drive means connected via at least one control means to at least one side beam enable the step unit to be retracted into and extended from a housing formed in the vehicle, a housing in a rotorcraft, in particular.

Consequently, the step unit is completely foldable and can therefore be contained in a small space such as a housing situated in the subfloor structure of a rotorcraft.

Thus, the drive means makes it possible to cause the bottom step of the step unit to pass from a position referred to below as a "closed position" in which the bottom step is inactive since the step unit is folded into a housing provided for this purpose, to a position referred to below as the "open position" in which the bottom step is active to assist a user when the step unit is extended from said housing.

Furthermore, said at least one control means is provided with left control means and right control means, the left control means being hinged to the stationary support and to the left side beam, with the right control means being hinged to the stationary support and the right side beam.

Similarly, the stationary support is provided with a left branch and with a right branch respectively hinged to the left and the right side beams.

Under drive from the drive means, the left and right control means pull or push the side beams, which side beams turn about their connection points to the branches of the stationary support. This turning movement enables the step unit to pass from an open position to a closed position, and vice versa.

Furthermore, as explained below, the drive means and said at least one control means lock the step unit in the desired, open or closed, position so as to avoid any risk of untimely opening or closing.

Furthermore, the step unit preferably comprises at least one rod hinged firstly to said bottom step, and secondly to a top portion of said stationary support.

For example, the step unit is provided with a right rod and with a left rod in the preferred embodiment.

Each rod is hinged to an offset portion of the bottom step, this offset portion being upstream from a pivot pin of the bottom step, a user placing a foot downstream from said pivot pin on entering into the vehicle, e.g. into a helicopter.

The rods then control the angle of inclination of the bottom step relative to the side beams.

In the closed position, this angle of inclination is small or even zero, so as to reduce the size of the step unit, whereas in the open position, this angle of inclination is optimized for improving user comfort.

At least one side beam may also be provided with a first abutment for blocking the bottom step at a predetermined angle when the step unit is unfolded, i.e. in the open position. The step unit is preferably provided with a right first abutment on the right side beam and with a left first abutment on the left side beam.

This predetermined angle corresponds to the angle that is to separate the bottom step from the side beams so that the bottom step is substantially horizontal, the horizontal position being perpendicular to a vertical axis as defined by gravity.

More precisely, the bottom step includes an offset portion in the form of an upside-down T-shape that co-operates with the first abutment to block the bottom step at the desired predetermined angle.

The step unit may also include a top step, a rear portion of the top step being fastened to the stationary support via a connection pin, while a front portion of the top step is arranged against the left and right side beams.

The top step is then optionally provided with a left side groove and a right side groove that co-operate respectively with a left anchor peg secured to the left side beam and with a right anchor peg secured to the right side beam.

Furthermore, in order to enable the drive means to drive the control means so as to retract the step unit into its housing or extend it therefrom, the drive means include a primary outlet shaft that acts, via a connection, to turn at least one secondary shaft secured to at least one control means.

It should be observed that the drive means may optionally be a declutchable electric motor, or manual drive means, suitable for turning the primary outlet shaft about its longitudinal primary axis of symmetry.

In a first embodiment, that is preferred, the step unit includes a single secondary shaft passing through the stationary support while remaining suitable for turning about its longitudinal secondary axis of symmetry. The left control means is consequently hinged to the left branch of the stationary support by being secured to a left fastener end of the secondary shaft, while the right control means is hinged to the right branch of the stationary support by being secured to a right fastener end of the second shaft.

An endless connection, such as a belt, then connects the primary shaft of the step unit to its secondary shaft.

Consequently, the drive means is connected to the side beams successively via its primary shaft, a connection, a secondary shaft, and at least one control means, and optionally specifically left control means and right control means.

The drive means then causes the primary shaft to turn clockwise or counterclockwise, as required, thereby turning the secondary shaft with the help of said connection, e.g. an endless belt connection. The secondary shaft delivers its motion to the control means which then push or pull the side beams to retract or extend the step unit.

In contrast, in a second embodiment, the step unit has a secondary shaft that is split into two distinct portions, more precisely a left secondary shaft and a right secondary shaft, each secondary shaft being arranged on the stationary support while remaining suitable for rotating about its longitudinal secondary axis of symmetry. The left control means are consequently hinged to the stationary support by being secured to the left secondary shaft, while the right control means are hinged to the stationary support by being secured to the right secondary shaft.

The primary shaft then passes right through the drive means, a connection, e.g. an endless connection such as a belt, connecting the left end zone of the primary shaft of the step unit to the left secondary shaft, while another connection connects the right end zone of the primary shaft of the step unit to the right secondary shaft.

Consequently, the drive means are connected to the side beams successively via the primary shaft, connections, left and right secondary shafts, and left and right control means.

The drive means then cause the primary shaft to turn clockwise or counterclockwise, as required, thereby in turn causing the left and right secondary shafts to turn. These left and right secondary shafts transfer their motion to the control means, which then push or pull the side beams so as to cause the step unit to be retracted or extended.

It should be observed that it is possible to envisage having two drive means, each having a respective primary shaft, each drive means turning one of the secondary shafts.

In a variant to the above embodiment, the endless connections may be replaced by gearing, a main shaft having main gearwheels that drive secondary gearwheels that are secured to a secondary shaft.

Furthermore, the control means comprise a lever and a connecting rod, the lever being hinged to the stationary support of the step unit and to the connecting rod of the control means, the connecting rod thus being hinged to the lever and to a side beam.

Furthermore, the lever is secured to a secondary shaft so as to be capable of turning about the longitudinal secondary axis of symmetry of said secondary shaft.

Furthermore, the connecting rod advantageously includes a movable portion that slides on a stationary portion of the connecting rod, the movable portion being secured to a side beam while the stationary portion is hinged to the lever of the control means.

The movable portion is then C-shaped, the stationary portion surrounding said secondary shaft in the closed position.

This particular characteristic of the connecting rod is particularly advantageously since it enables the control means to be locked in the open position or in the closed position.

Finally, the step unit may be fitted with second and third abutments for controlling the movements of some of its elements.

The stationary support is then provided with at least one second abutment for blocking a side beam when the step unit is folded.

Whatever the embodiment, the left branch of the stationary support possesses a left second abutment acting as a stop for the left side beam, while the right branch of the stationary support possesses a right second abutment acting as a stop for the right side beam.

Similarly, the stationary support has at least one third stop for blocking the control means, and in particular its lever, when the step unit is unfolded in the open position.

Consequently, the left branch of the stationary support possesses a left third abutment acting as a stop for the left lever of the left control means, the right branch of the stationary support possessing a right third abutment acting as a stop for the right lever of the right control means.

Since the lever of each control means is secured to a secondary shaft in order to be capable of turning about the secondary longitudinal axis of symmetry of said secondary shaft, the step unit is provided with a return spring arranged on the secondary shaft so as to keep the control means in contact with the second abutment when the step unit is unfolded in the open position.

The return spring then tends to lock the control means in the open position.

The present invention also provides a vehicle having a subfloor structure in the bottom of its structure, e.g. a rotorcraft provided with a subfloor structure in the bottom of its fuselage. The vehicle then includes a step unit of the invention that, when folded in its closed position, is contained entirely within a housing provided as much as possible within said subfloor structure.

In flight, and for aerodynamic reasons, the housing is closed by a bottom cover, which is moved on the ground by at least a first arm that is moved by an eccentric cam so as to enable the step unit to be unfolded, the cam being turned by a secondary shaft of the step unit when it is itself turned by drive means.

Advantageously, the step unit has a left first arm and a right first arm that are fastened to at least one secondary shaft, the secondary shaft being moved by the drive means. In the first embodiment, the left and right first arms are fastened respectively to the left and right fastener ends of a single secondary shaft via respective eccentric cams, while in the second embodiment, the left and right first arms are fastened to respective left and right secondary shafts, via respective eccentric cams.

Consequently, the drive means serve both to deploy the step unit and also to open the bottom cover.

On being driven by the drive means, the secondary shaft(s) act(s) on the first arms via the cams so as to open the bottom cover.

Once this preliminary operation has been completed, these secondary shafts continue to turn. They then cause the side beams to turn so as to deploy the bottom step, and where appropriate the top step of the step unit.

Likewise, when the housing is closed in flight by a top cover, the top cover is caused to move on the ground by at least one second arm hinged to a top step of the step unit, with deployment of the top step entraining movement of the top cover.

Advantageously, the step unit has left and right second arms, each secured to the top step.

Deploying the top step from a closed position to an open position then has the consequence of retracting the top cover.

BRIEF DESCRIPTION OF THE DRAWINGS

The invention and its advantages appear in greater detail from the following description of embodiments given by way of illustration and with reference to the accompanying figures, in which.

Elements that are present in more than one figure are given the same reference numeral in all of them.

MORE DETAILED DESCRIPTION

Figures 1, 2:
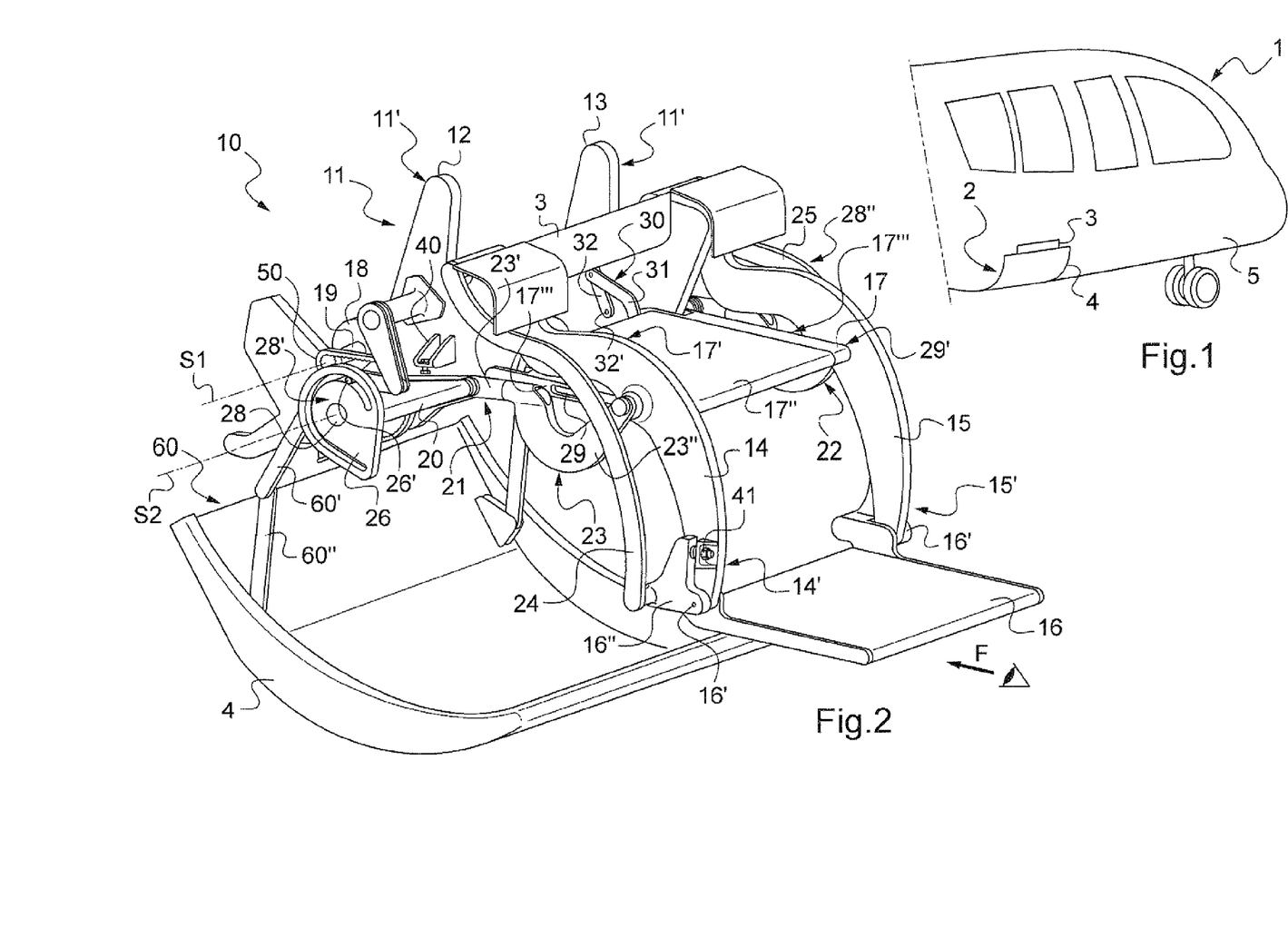
FIG. 1 is a diagrammatic view of a rotorcraft provided with a step unit.
FIG. 2 is an isometric view of a step unit in a first embodiment, shown in the open position.

FIG. 1 is thus a diagrammatic view of a rotorcraft 1 provided with a step unit of the invention, the step unit being arranged within a housing 2 formed in the subfloor structure 5 of the rotorcraft 1.

As shown in FIG. 1, the housing 2 may be closed with the help of a bottom cover 4 and a top cover 3 so as to avoid generating aerodynamic disturbances in flight. The step unit is then in a closed position, being folded so as to be fully contained within the housing 2.

In contrast, on the ground, the step unit can open the bottom and top covers 4 and 3 so as to fold out into an open position.

A user can then step easily into or out from the rotorcraft by using the step unit.

Figure 3:
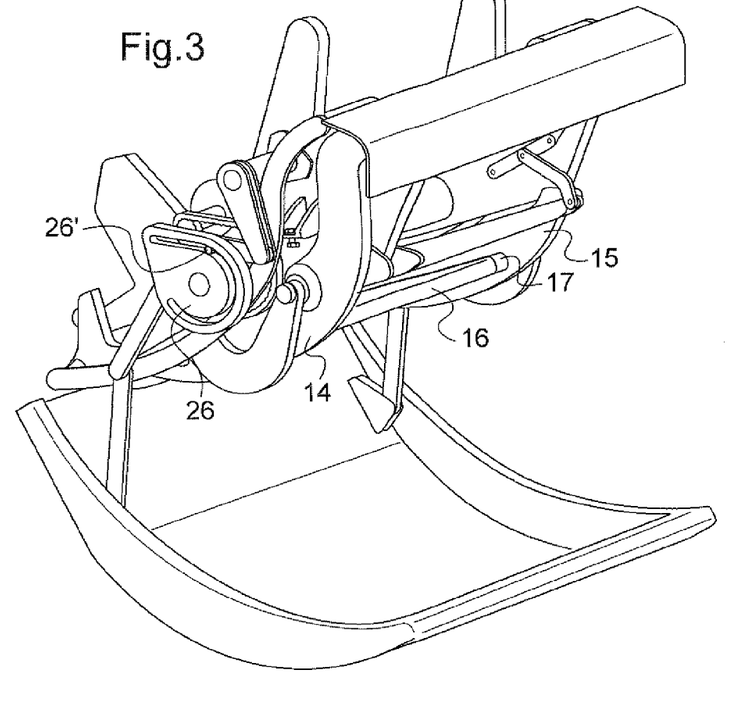
FIG. 3 is an isometric view of a step unit in a first embodiment, shown an intermediate position.
Figure 4:
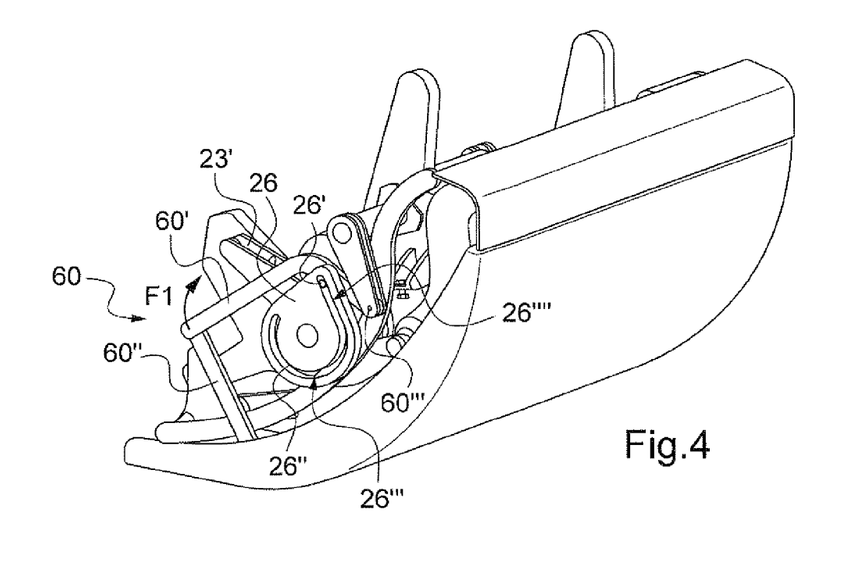
FIG. 4 is an isometric view of a step unit in a first embodiment, shown in the closed position.

FIGS. 2 to 4 show a folding step unit 10 constituting a first embodiment of the invention, which is shown respectively in the open position, in an intermediate position, and in the closed position.

With reference to FIG. 2, the step unit 10 is provided with a support 11 having a left branch 12 and a right branch 13 secured to The structure of the rotorcraft within the housing 2 that is provided for this purpose.

Furthermore, the step unit 10 is provided with a left side beam 14 and a right side beam 15 hinged respectively to the left and right branches 12 and 13 of the stationary support 11. Each side beam 14, 15 is thus suitable for turning about the hinge that connects it to one of the branches 12, 13 of the stationary support 11.

A bottom step 16 of the step unit is then arranged between the left and right side beams 14 and 15. More precisely, the bottom step 16 is placed between the left and right side beams 14 and 15 by being fastened firstly to a left free end 14' of the left side beam 14 via a pivot pin 16' and secondly to a right free end 15' of the right side beam 15 by another pivot pin 16'. When an observer looks at the step unit along arrow F, the left side beam 14 is then situated to the left of the bottom step 16, the right side beam 15 being situated to the right of the bottom step 16. The terms "left" and "right" thus refer below to the positions of the elements concerned relative to the bottom step 16.

The bottom step 16 is thus capable of pivoting about its pivot pins 16', e.g. constituted by fastener screws.

Nevertheless, the bottom step 16 has two upside-down T-shaped offset portions 16" situated upstream from each pivot pin 16'. When the step unit is in the open position, each offset portion 16" co-operates with a first abutment 41 of each side beam 14, 15 to hold the bottom step 16 at a predetermined angle relative to the side beams 14, 15.

This predetermined angle preferably enables the bottom step 16 to be in a horizontal position, i.e. in a plane perpendicular to the force of gravity. Consequently, if a user places a foot on the bottom step 16, necessarily downstream from the pivot pins 16', the bottom step 16 will conserve said predetermined angle relative to the side beams because of the co-operation between each offset portion 16" and each first abutment 41.

In addition, the step unit 10 has two rods 24 and 25 hinged on either side of the bottom step 16 to the offset portions 16".

Thus, a left rod 24 is hinged to an offset portion 16" and to the top portion 11" of the left branch 12 of the stationary support 11. Similarly, the right rod 25 is hinged to an offset portion 16" of the bottom step 16 and also to the top portion 11' of the right branch 13 of the stationary support 11.

The step unit 10 is then fitted with a top step 17 having a rear portion 17' that is fastened to the left and right branches 12 and 13 of the support via connection pins. The rear portion 17' of the top step is thus arranged between the left and right branches 12 and 13, while being capable of performing a pivoting movement about the connection pins during folding and unfolding of the step unit 10.

In contrast, the front portion 17" of the top step 17 is arranged between the left and right side beams 14 and 15.

More precisely, the side faces 17''' of the top step 17 are grooved, the top step thus possessing a left side groove 29 and a right side groove 29'.

Each of the left and right side beams 14 and 15 has a respective anchor peg. The anchor peg of the left side beam 14 is thus placed in the left groove 29 white the anchor peg of the right side beam 15 is placed in the right groove 29'.

Furthermore, in order to be able to pass from an open position to a closed position, and vice versa, the step unit 10 includes drive means 18, e.g. an electric motor, connected by at least one control means 21, 22 to the side beams. The drive means 18 then enable the side beams 14, 15 to be turned via said at least one control means 21, 22 about their respective hinges to the stationary support 11 so as to cause the bottom and top steps 16 and 17 to be retracted into or extended out from the housing 2 in the rotorcraft 1.

Said at least one control means is then provided with left control means 21 hinged via the left fastener end 28' of a secondary shaft 28 to the left branch 12 of the stationary support 11, and to the left side beam 14.

Similarly, said at least one control means is provided with right control means 22 hinged to the right branch 13 of the stationary support 11 via the right fastener end 28" of the secondary shaft 28, and to the right side beam 15.

The drive means 18 is then suitable for driving a primary outlet shaft 19 to rotate about its primary longitudinal axis of symmetry S1.

Furthermore, this primary shaft 19 in turn imparts motion to the right and left control means 21 and 22. The primary shaft 19 is connected to the left fastener end 28' of the secondary shaft 28 via a connection, specifically a belt 50, thereby driving said secondary shaft 28 to turn about its longitudinal axis of symmetry S2. The left and right control means 21 and 22 are secured to the left and right fastener ends 28' and 28" of the secondary shaft, so the left and right control means 21 and 22 are naturally set into motion by the primary shaft 19 via the secondary shaft 28.

Consequently, when the drive means 18 turns clockwise, it imparts identical rotation to the primary shaft 19.

The primary shaft 19 then turns the left and right control means 21 and 22 clockwise. The left and right side beams 14 and 15 then also turn clockwise, thereby enabling the step unit to be folded from an open position into a closed position.

It will be understood that in order to fold the step unit 10 out and cause it to go into an open position, the drive means should in contrast turn in the counterclockwise direction.

In addition, in order to perform their function, the control means 21, 22 each include a lever 20 and a connecting rod 23.

The left control means 21 thus possess a left lever 20 that is firstly secured to the left fastener end 28' of the secondary shaft 28 and that is secondly hinged to a left connecting rod 23. This left connecting rod 23 is thus hinged to the left lever 20, and also to the left side beam 14.

Similarly, the right control means 22 thus possess a right lever 20 that is firstly secured to the right fastener end 28" of the secondary shaft 28, and that is secondarily hinged to a right connecting rod 23. This right connecting rod 23 is thus hinged to the right lever 20 and also to the right side beam 15.

In order to be able to perform the required movements, and in order to participate in stabilizing the step unit 10, each connecting rod 23 has a stationary portion 23' and a moving portion 23" that is suitable for sliding on the stationary portion 23'.

The stationary portion 23' is then hinged on the lever of the control means, while the moving portion 23", which is C-shaped, is secured to a side beam.

It can be seen below that the C-shaped moving portion 23" of the connecting rod 23 advantageously goes round the corresponding secondary shaft 28 in the closed position.

Furthermore, the step unit 10 is also suitable for opening the bottom and top covers 4 and 3 prior to deployment. Conversely, when the step unit 10 is folded inside the housing 2, the step unit 10 closes the bottom and top covers 4 and 3.

Consequently, the step unit has a right cam 26 arranged on the right fastener end 28" of the secondary shaft 28 that is fastened on the right branch 13 of the stationary support 11, this right cam 26 being connected to the bottom cover via a right first arm 60 provided with a right primary first arm 60' and a right secondary first arm 60".

Secondarily, the step unit possesses a left cam 26 arranged on the left fastener end 28' of the secondary shaft 28 fastened on the left branch 12 of the stationary support 11, the left cam 26 being connected to the bottom cover via a left first arm 60 provided with a left primary first arm 60' and a left secondary first arm 60".

The top cover 3 located between the left and right branches 12 and 13 of the step unit 10 is provided with a second arm 30 that is hinged to the top step 17, with pivoting of the top step 17 causing the top cover 3 to be moved.

With reference to FIG. 2, the step unit 10 is shown in the open position, the bottom and top steps 16 and 17 being deployed and extending from the housing 2 in the rotorcraft 1.

In flight, it is appropriate to store the step unit 10 inside the housing 2 so that the step unit 10 does not give rise to aerodynamic disturbances.

The drive means 18, e.g. under the control of the rotorcraft pilot, then turns counterclockwise and delivers its drive to the primary shaft 19.

The primary shaft 19 then acts via the belt 50 to cause the secondary shaft 28 to rotate, the secondary shaft 28 passing through the stationary support 11 so that its left and right fastener ends 28' and 28" project respectively from the left and right branches 12 and 13 of the stationary support 11.

Each fastener end 28', 28" of the secondary shaft 28 is secured to a respective lever 20 of a control means 21, 22 and also to a cam 26, these levers 20 and cams 26 being caused to rotate about the longitudinal secondary axis of symmetry S2 of the secondary shaft 28.

Figure 5:
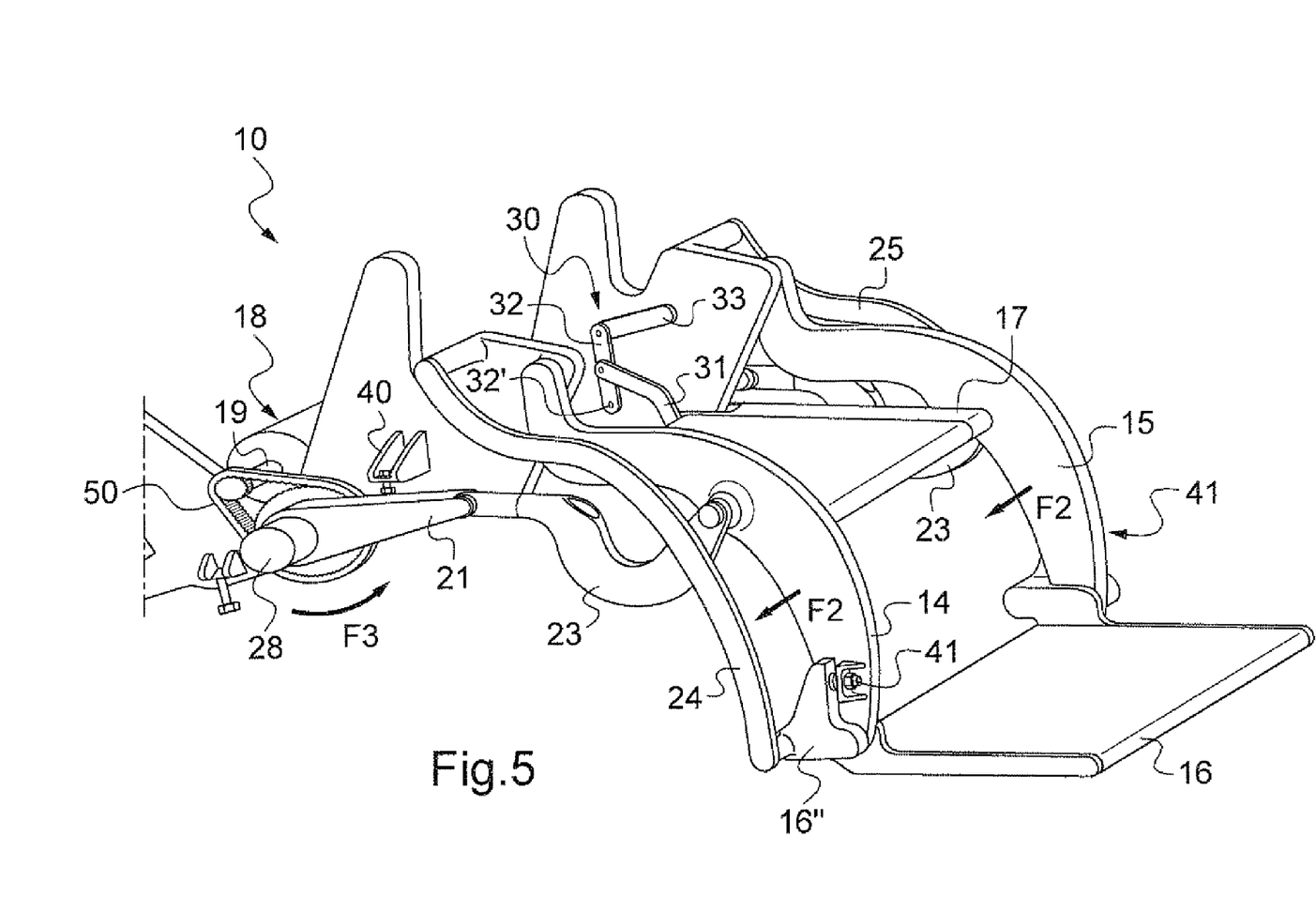
FIG. 5 is a diagrammatic view showing control means for the step unit constituting a first embodiment, shown in the open position.

As shown in FIG. 5, each lever 21 drives movement of the connecting rod 23 of its control means so as to cause the side beams 14, 15 to pivot.

These side beams 14, 15 then fold into the housing 2.

In addition, since the bottom step 16 is fastened by its offset portions 16" to rods 24, 25 that are hinged to the stationary support 11, the bottom step 16 turns about its pivot axes 16'. In the intermediate position shown in FIG. 3, the bottom step 16 is completely folded and does not project from the side beams 14, 15, thereby minimizing the space occupied by the step unit 10 when folded.

Similarly, the anchor pegs of the side beams 14, 15 slide in the side grooves 29, 29' of the top step 17. The top step 17 tilts in turn about its connection pins so as to avoid projecting from the side beams 14, 15 in the intermediate position, and more generally in the closed position.

Furthermore, the movement of the top step 17 gives rise to movement of the top cover 3 via a second arm.

More precisely, the secondary arm comprises a primary second arm 31 secured to the top step 17, a secondary second arm 32, and a tertiary second arm 33 that can be seen in FIG. 5.

Under drive from the top step 17, the primary second arm moves. However this second arm 31 is hinged to a secondary second arm that is secured firstly to the stationary support 11 by fastener means 32', and that is hinged secondly to a tertiary second arm.

Consequently, the secondary second arm pivots in turn about its fastener means 32' and pushes the tertiary second arm 33.

Since this tertiary second arm 33 that is arranged between the side beams 14 and 15 is secured to the top cover 3, the top cover 3 is in turn pushed by the tertiary second arm 33 so as to close the housing 2 in part.

Advantageously, the step unit 10 has two second arms 30 for making it easier to handle the top cover 3 and avoid any risk of jamming.

In the intermediate position shown in FIG. 3, the side beams 14, 15 and the bottom and top steps 16 and 17 are folded, and already in the closed position.

However, it can be seen that so far rotary movement of the cams 26 has not yet had any effect on the bottom cover 4.

Nevertheless, the rotary movement of the drive means 18, and thus of the secondary shaft 28, is continued and does not stop once the intermediate position has been reached.

With reference to FIG. 4, it should be observed that the cam 26 has a slot in which a finger 26' is suitable for sliding, the finger 26' being secured to the first arm 60.

More precisely, the first arm 60 comprises a primary first arm 60' having a bend and a secondary first arm 60", the finger 26' being secured to the primary first arm 60 at its bend.

During pivoting of the cam 26, the finger 26' slides in the slot 26" of the cam 26. Since this slot is made up of a circularly arcuate portion 26''' extended by a rectilinear portion 26'''', when the finger 26' passes from the circularly arcuate portion to the rectilinear portion, the cam 26 exerts a force on the finger 26'. The bend in the primary first arm 60' is hinged on support means 60" fastened to the stationary support 11, so the primary first arm 60' then moves in the direction of arrow F1 about the hinge of the support means 60''', this movement being driven by the force exerted by the cam 26 on the finger 26'.

Subsequently, the primary first arm 60' causes the secondary first arm 60" to move, and thus moves the bottom cover 4 that tilts about points where it is fastened to the subfloor structure of the rotorcraft (not shown in the figures) so as to pass into the closed position.

It will thus be understood that when the finger 26' moves away from the circularly arcuate portion of the cam 26, the cam 26 drives closure of the bottom cover 4. In contrast, when the finger 26' slides in the rectilinear portion of the slot in the cam going towards the circularly arcuate portion, the cam 26 causes the bottom cover to open.

Finally, when the finger 26' slides in the circularly arcuate portion, the cam has no influence on the bottom cover.

Furthermore, during closure of the bottom cover 4, each lever 20 continues to turn. The moving portion 23" of each connecting rod then slides relative to its stationary portion 23'.

Although the lever 20 and the connecting rod 23 of a control means are substantially in alignment one behind the other in the open position, they are on the contrary superposed in the closed position, the stationary portion 23' of the connecting rod then being arranged in the lever 20. The C-shaped moving portion 23" of each connecting rod 23 then advantageously surrounds the secondary shaft 28 to which it is connected.

From this movement the step unit is in the closed position.

It can be observed that a single drive means 18 serves firstly to fold the bottom and top steps 16 and 17 of the step unit, and secondly to move the bottom and top covers 4 and 3 so as to close the housing 2. The multiple functions of the drive mean, act via the linkages provided to limit the number of motors needed for folding and unfolding the step unit, thereby providing financial savings and a non-negligible saving in space.

It can be observed that the step unit 10 is extremely compact, thereby ensuring that it can be installed in the subfloor structure 5 of a rotorcraft 1, minimizing any potential for the step unit 10 to project from the hull quarter profile of the subfloor structure.

Furthermore, it will readily be understood that the operation of unfolding the step unit 10 by causing it to pass from a closed position as shown in FIG. 4 to an open position as shown in FIG. 2 makes use of the same elements of the step unit 10. However the drive means 18 then turn in the counterclockwise direction in order to obtain the desired result.

Furthermore, the step unit needs to be Locked both in the open position and in the closed position in order to avoid any untimely folding or unfolding of the step unit.

With reference to FIG. 5, when a user exerts a force on a step, the left and right side beams 14 and 15 tend to fold by moving in the direction of arrows F2.

Such a movement would tend to move the connecting rods 23. However the levers 20 prevent such movement insofar as each of them is prevented from moving by a third abutment 40 against which said lever 20 is held when the step unit 10 is unfolded, i.e. in the open position.

It is also possible to envisage providing the secondary shaft 28 with a return spring tending to hold each lever 20 of a control means 21, 22 against a third abutment 40, i.e. a left third abutment 40 for the left lever of the left control means 21 and a right third abutment 40 for the right lever of the right control means 22.

In the open position, the step unit 10 is thus securely locked.

It is recalled that the bottom step 16 is also particularly stable. When in the open position, a predetermined angle is maintained between the bottom step 16 and the side beams 14 and 15.

When a user bears against the bottom step 16, its offset portions 16" are prevented from moving by the first abutments 41 so as to prevent any movement of the bottom step 16.

Similarly, since the side beams 14, 15 are held in the open position, the top step 17 is necessarily stable.

Figure 6:
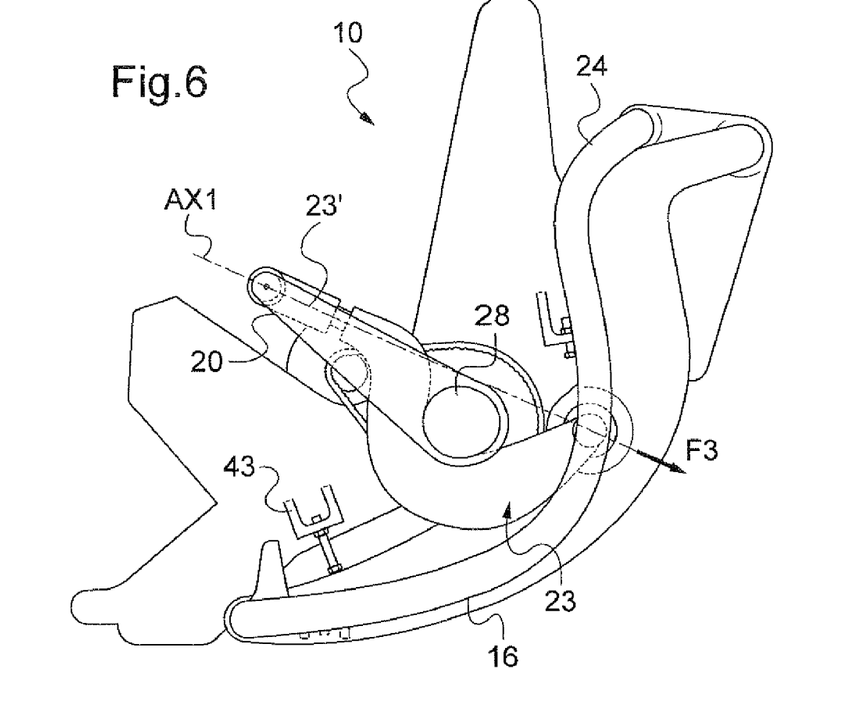
FIG. 6 is a diagrammatic view showing control means for a step unit in a first embodiment, shown in the closed position.

With reference to FIG. 6, it is appropriate to ensure that the step unit 10 is also locked when in the closed position so as to avoid any untimely opening of the step unit.

In the closed position, each side beam needs to remain blocked against a second abutment 43.

In this position, the return axis AX1 of each control means 21, 22 passes over the secondary shaft 28, while the moving portion 23" of each connecting rod surrounds said secondary shaft 28.

Thus, if forces F3 are tending to open the step unit 10, these forces cannot deploy the control means, and therefore cannot deploy the side beams together with the covers, insofar as they are locked mechanically by the way they are arranged in the closed position.

Similarly, the bottom step 16 cannot unfold since it is blocked by the rods 24 and 25, the top step 17 being held in position by the side beams.

The step unit is thus stable both in the open position and in the closed position, and therefore is suitable for use under extreme conditions on a rotorcraft 1.

Figure 7:
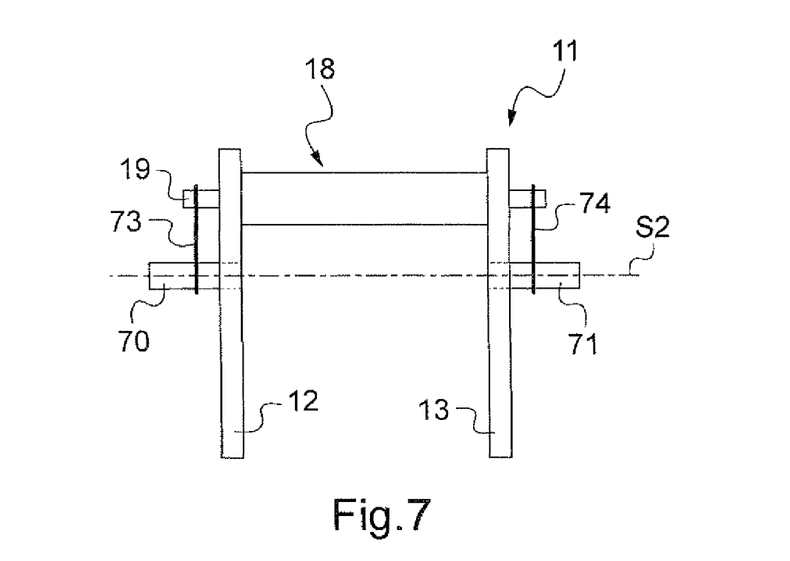
FIG. 7 is a diagrammatic view of a secondary shaft in a second embodiment.

FIG. 7 is a diagrammatic view of a secondary shaft in a second embodiment.

The secondary shaft is here split into two distinct portions. Thus, the secondary shaft comprises a left secondary shaft 70 hinged to the left branch 12 of the stationary support 11, and a right secondary shaft 71 hinged to the right branch 13 of the stationary support 11.

Furthermore, the primary shaft 19 passes through the drive means 18. Consequently, the left extreme zone of the primary shaft 18 is connected to the left secondary shaft 70 via a belt 73, while the right extreme zone of said primary shaft 18 is connected to the right secondary shaft 71 via another belt 74.

The drive means 18 can thus impart rotation to the left and right secondary shafts 70 and 71 about their longitudinal secondary axis of symmetry S2.

A variant of this second embodiment can consist in using two distinct drive means operating simultaneously for driving the left and right secondary shafts 70 and 71 respectively.

Naturally, the present invention is capable of numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

It is also possible to envisage providing at least one holding spring that tends to support the weight of the bottom cover 4, each return spring being secured both to the bottom cover 4 and to the stationary support 10.

Similarly, the drive means may be a declutchable motor so as to enable opening to be performed manually, where necessary, or indeed the drive means may themselves be manual.

Finally, the figures relate to a step unit for a rotorcraft. Nevertheless, the invention can be applied to other vehicles, an aircraft, a land vehicle, a watercraft, for example.

What is claimed is:

1. A foldable step unit for a vehicle, the step unit being provided with a bottom step and with a stationary support that is secured to the structure of the vehicle, the step unit comprising a single left side beam and a single right side beam, which side beams are hinged to said stationary support, said bottom step being arranged on a left free end and a right free end respectively of the left and right side beams via a pivot pin, and the step unit comprising drive means for driving said step unit connected via at least one control means to at least one side beam enabling said step unit to be retracted into and to be extended from a housing formed in said vehicle, and the step unit further comprising a top step, a rear portion of said top step being fastened to said stationary support, while a front portion of said top step is arranged against the left and right side beams, the step unit further comprising at least one rod hinged firstly to said bottom step, and secondly to a top portion of said stationary support.

2. A step unit according to claim 1, wherein said at least one control means is provided with left control means and right control means, the left control means being hinged to the stationary support and to the left side beam, while the right control means is hinged to the stationary support and to the right side beam.

3. A step unit according to claim 1, wherein said stationary support is provided with a left branch and a right branch respectively hinged to the left and the right side beams.

4. A step unit according to claim 1, wherein said rod is hinged to an offset portion of said bottom step, said offset portion being upstream from a pivot pin of the bottom step, a user placing a foot downstream from said pivot pin on entering into the vehicle.

5. A step unit according to claim 1, wherein said drive means comprise a primary outlet shaft that acts via a connection to turn at least one secondary shaft secured to at least one control means.

6. A step unit according to claim 4, wherein said step unit includes a single secondary shaft passing through the stationary support while remaining suitable for turning about its longitudinal secondary axis of symmetry.

7. A step unit according to claim 5, wherein said secondary shaft is split into two distinct portions comprising a left secondary shaft and a right secondary shaft, each secondary shaft being arranged on the stationary support and remaining suitable for turning about its longitudinal secondary axis of symmetry b.

8. A step unit according to claim 7, wherein said step unit includes left and right control means, the left control means is hinged to the stationary support by being secured to the left secondary shaft, while the right control means is hinged to the stationary support by being secured to the right secondary shaft.

9. A step unit according to claim 2, wherein each control means includes a lever and a connecting rod, said lever being secured to a said secondary shaft and to said connecting rod, said connecting rod being hinged to said lever and to one of the side beam.

10. A step unit according to claim 9, wherein said connecting rod has a movable portion that slides on a stationary portion of the connecting rod, said movable portion being secured to one of the side beam while the stationary portion is hinged to the lever of the control means.

11. A step unit according to claim 10, wherein said movable portion is C-shaped, said stationary portion surrounding said secondary shaft in the closed position.

12. A step unit according to claim 1, wherein at least one side beam has a first abutment for blocking said bottom step at a predetermined angle when said step unit is unfolded.

13. A step unit according to claim 1, wherein said stationary support includes at least one abutment for blocking a side beam when said step unit is folded up.

14. A step unit according to claim 1, wherein a lever is secured to a secondary shaft in order to be capable of turning about the longitudinal secondary axis of symmetry of said secondary shaft, and said step unit is provided with a return spring arranged on said secondary shaft in order to hold the control means in contact with an abutment when the step unit is unfolded.

15. A vehicle having a subfloor structure in the bottom zone of its structure, said housing being formed in said subfloor structure, the vehicle including a step unit according to claim 1, that, when the step unit is folded, is contained entirely within said housing.

16. A vehicle according to claim 15, wherein said housing is closed in flight by a bottom cover, and said bottom cover is caused to move on the ground by at least a first arm that is moved by an eccentric cam so as to enable the step unit to be unfolded, said cam being turned by a secondary shaft of the step unit that is turned by drive means.

17. A vehicle according to claim 15, wherein said housing is closed in flight by a top cover, said top cover being moved on the ground by at least a second arm hinged to said top step of the step unit, deployment of said top step entraining movement of said top cover.

18. A vehicle according to claim 16, wherein said vehicle is a rotorcraft provided with said subfloor structure in the bottom zone of its fuselage.

19. A foldable step unit for a vehicle, the step unit being provided with a bottom step and with a stationary support that is secured to the structure of the vehicle, the step unit comprising a single left side beam and a single right side beam, which side beams are hinged to said stationary support, said bottom step being arranged on a left free end and a right free end respectively of the left and right side beams via a pivot pin, and the step unit comprising drive means for driving said step unit connected via at least one control means to at least one side beam enabling said step unit to be retracted into and to be extended from a housing formed in said vehicle, and the step unit further comprising a top step, a rear portion of said top step being fastened to said stationary support, while a front portion of said top step is arranged against the left and right side beams, wherein said stationary support includes an abutment for blocking said at least one control means when said step unit is unfolded.

20. A foldable step unit for a vehicle, the step unit being provided with a bottom step and with a stationary support that is secured to the structure of the vehicle, the step unit comprising a single left side beam and a single right side beam, which side beams are hinged to said stationary support, said bottom step being arranged on a left free end and a right free end respectively of the left and right side beams via a pivot pin, and the step unit comprising drive means for driving said step unit connected via at least one control means to at least one side beam enabling said step unit to be retracted into and to be extended from a housing formed in said vehicle, and the step unit further comprising a top step, a rear portion of said top step being fastened to said stationary support, while a front portion of said top step is arranged against the left and right side beams, wherein said top step is provided with a left side groove and with a right side groove that co-operate respectively with a left anchor peg secured to the left side beam and with a right anchor peg secured to the right side beam.

* * * * *